(12) United States Patent
Cook

(10) Patent No.: US 8,123,371 B2
(45) Date of Patent: Feb. 28, 2012

(54) ALL-REFLECTIVE AFOCAL TELESCOPE DERIVED FROM THE FIRST TWO MIRRORS OF A FOCAL THREE-MIRROR ANASTIGMAT TELESCOPE

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 398 days.

(21) Appl. No.: 12/369,976

(22) Filed: Feb. 12, 2009

(65) Prior Publication Data

US 2010/0202073 A1 Aug. 12, 2010

(51) Int. Cl.
- *G02B 5/10* (2006.01)
- *G02B 5/08* (2006.01)
- *G02B 17/00* (2006.01)

(52) U.S. Cl. ......... 359/859; 359/861; 359/729; 359/728
(58) Field of Classification Search .................... 359/859
See application file for complete search history.

(56) References Cited

U.S. PATENT DOCUMENTS

| | | | |
|---|---|---|---|
| 3,674,334 A | 7/1972 | Offner | |
| 4,101,195 A | 7/1978 | Frosch et al. | |
| 4,804,258 A | 2/1989 | Kebo | |
| 5,078,502 A | 1/1992 | Cook | |
| 6,767,103 B2 * | 7/2004 | Cook | 359/859 |
| 6,970,286 B1 * | 11/2005 | Kunick | 359/366 |

OTHER PUBLICATIONS

International Search Report/Written Opinion dated May 27, 2010 of PCT/US20101023633 filed Feb. 9, 2010 (15 pages).

* cited by examiner

*Primary Examiner* — Jade R Chwasz
(74) *Attorney, Agent, or Firm* — Lando & Anastasi, LLP

(57) ABSTRACT

An all-reflective optical system includes a primary mirror of ellipsoidal configuration, a secondary mirror of hyperboloidal configuration facing the primary mirror, and an eye-piece that includes: a positive-powered tertiary mirror having a majority of positive power that is expected in the eye-piece and configured to substantially collimate light rays incident thereon; and a negative-powered near-flat quaternary mirror having lesser power than the tertiary mirror and configured to receive the substantially collimated light rays from the tertiary mirror, further collimate the received light rays and reflect the further collimated light rays to an exit pupil. The primary mirror, the secondary mirror and the eye-piece thereby form an afocal optical system.

13 Claims, 4 Drawing Sheets

ALL-REFLECTIVE AFOCAL TELESCOPE DERIVED FROM THE FIRST TWO MIRRORS OF A FOCAL THREE-MIRROR ANASTIGMAT TELESCOPE

BACKGROUND

The present disclosure relates to all-reflective optical systems and in particular to an all-reflective afocal optical system, such as an all-reflective afocal telescope, that is derived from the first two mirrors of a focal three-mirror anastigmat optical system, such as a focal three-mirror anastigmat telescope.

An example of a conventional focal three-mirror anastigmat telescope is illustrated by U.S. Pat. No. 4,101,195 to Korsch, entitled "Anastigmatic Three-Mirror Telescope", the entire contents of which is incorporated herein by reference. The patent discloses a focal three-mirror telescope having an ellipsoidal primary mirror, a hyperbolic secondary mirror, and an ellipsoidal tertiary mirror, with the three mirrors producing an image in a conveniently located finite plane for viewing.

An example of a conventional all-reflective afocal telescope is illustrated by U.S. Pat. No. 3,674,334 to Offner, entitled "Catoptric Anastigmatic Afocal Optical System", the entire contents of which is incorporated herein by reference. The patent discloses a catoptric anastigmatic afocal optical system comprising two concave paraboloidal reflectors of different powers for the primary and tertiary mirrors and a convex hyperboloidal secondary mirror reflector adapted to receive and recollimate radiant energy.

Focal and afocal telescopes are individually best suited for different imaging tasks. For example, certain imaging tasks such as wide area search functions are preferably done in a vehicle scanning mode using linear focal plane array (FPA) technology. A focal three-mirror anastigmat telescope may be best suited for these tasks. Also, certain other imaging tasks such as point collects for detailed interrogation and characterization are best done behind an afocal optical system because such tasks use custom instruments with two-dimensional (2D) staring FPA's or internally scanned linear FPAs. An afocal telescope may be best suited for these tasks.

Thus, depending on the imaging tasks to be performed, conventionally different telescopes have to be used. What is needed is an all-reflective optical system that may be constructed to provide both focal and afocal optical functions.

SUMMARY

In an embodiment, an all-reflective optical system, comprises a primary mirror of ellipsoidal configuration; a secondary mirror of hyperboloidal configuration facing said primary mirror; and an eye-piece comprising: a positive-powered tertiary mirror having a majority of positive power that is expected in the eye-piece and configured to substantially collimate light rays incident thereon; and a negative-powered near-flat quaternary mirror having lesser power than said tertiary mirror and configured to receive the substantially collimated light rays from the tertiary mirror, further collimate the received light rays and reflect the further collimated light rays to an exit pupil, wherein the primary mirror, the secondary mirror and the eye-piece form an afocal optical system.

In one embodiment, a method comprises reflecting, using a primary mirror of ellipsoidal configuration, light rays incident thereon; reflecting, using a secondary mirror of hyperboloidal configuration facing said primary mirror, the light rays received from the primary mirror towards an eye-piece; substantially collimating, using a positive-powered tertiary mirror in the eye-piece, the light rays received from the secondary mirror and reflecting, using the positive-powered tertiary mirror, the substantially collimated light rays, wherein the positive-powered tertiary mirror has a majority of positive power that is expected in the eye-piece; receiving, using a negative-powered near-flat quaternary mirror in the eye-piece, the substantially collimated light rays from the positive-powered tertiary mirror, wherein the quaternary mirror has lesser power than said tertiary mirror; further collimating, using the negative-powered near-flat quaternary mirror, the substantially collimated light rays received from the positive-powered tertiary mirror; and reflecting, using the negative-powered near-flat quaternary mirror, the further collimated light rays to an exit pupil, wherein the primary mirror, the secondary mirror and the eye-piece form an afocal optical system.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

The present disclosure relates to all-reflective optical system that may be constructed to provide both focal and afocal optical functions while sharing at least the first two mirrors of a focal three-mirror anastigmat optical system.

Figure 1:
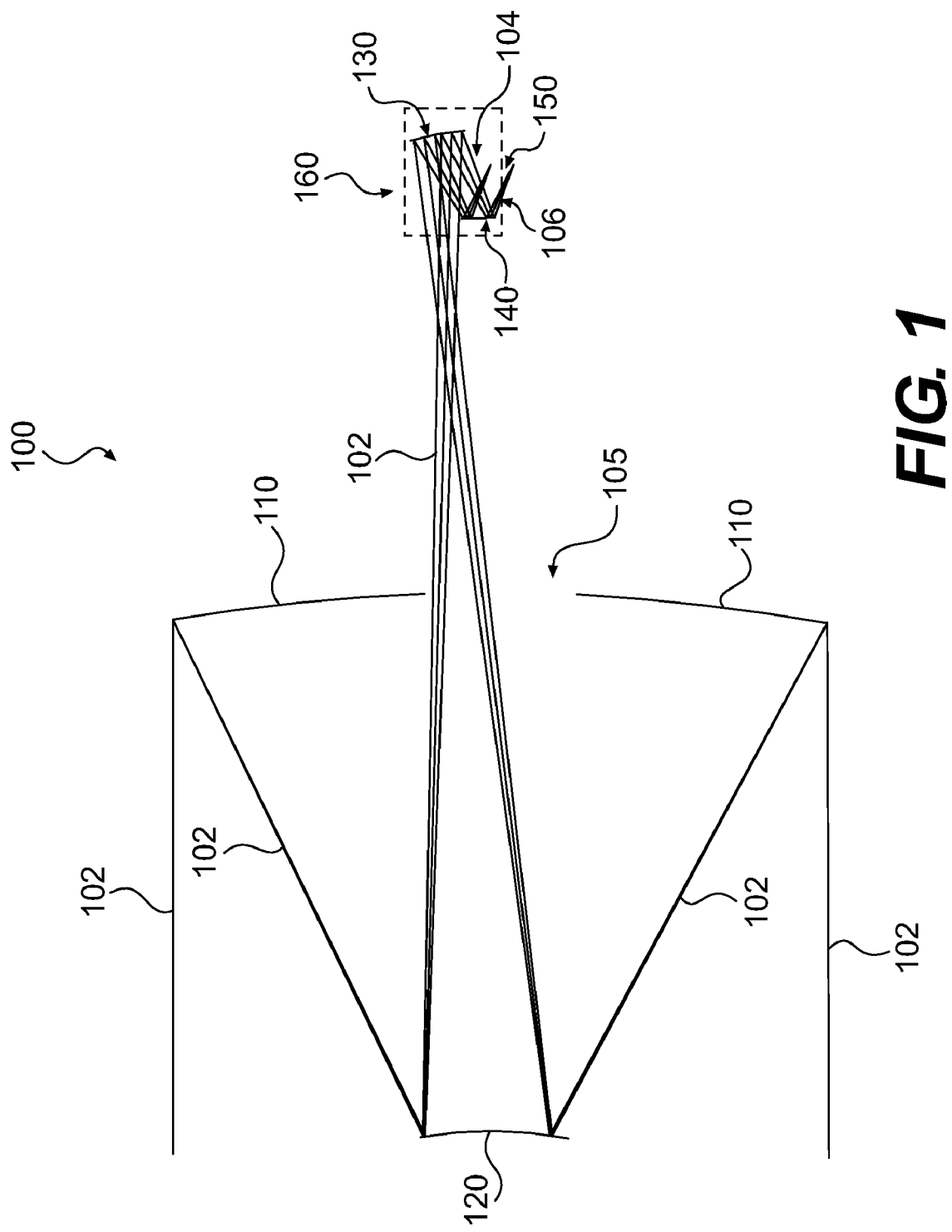
FIG. 1 is an exemplary illustration of a ray-trace section of an all-reflective optical system 100, in accordance with an embodiment.

FIG. 1 depicts a ray-trace section of all-reflective optical system 100 that is constructed to provide afocal optical functions, in accordance with an embodiment. The first two mirrors of optical system 100 are primary mirror 110 and secondary mirror 120. Primary mirror 110 having central opening 105 may be a positive-powered ellipsoidal mirror. Secondary mirror 120 may be a smaller and centered negative-powered hyperbolic mirror. In one embodiment, these first two mirrors (i.e., primary mirror 110 and secondary mirror 120) may be arranged in a classical Cassegrain-like arrangement and have conic or aspheric departures that are optimal for use in conventional image-forming or focal three-mirror anastigmat optical systems, but are non-optimal for use in afocal optical systems. Primary mirror 110 and secondary mirror 120 are non-optimal for use in afocal optical systems because an afocal optical system conventionally requires a paraboloid or hyperboloid primary mirror, not an ellipsoid, and a radically different base radius and conic hyperboloid secondary mirror. Further, the separation between the primary and the secondary mirror constructed for use in the focal optical system is typically appreciably longer than that of the afocal optical system.

In one embodiment, optical system 100 further comprises all-reflective multi-mirror eye-piece 160 that is positioned behind primary mirror 110 and secondary mirror 120 to form a high performance afocal optical system (in other words, an optical system that can provide afocal optical functions). In one embodiment, eye-piece 160 comprises tertiary mirror 130 and quaternary mirror 140. Light rays 102 impinge on primary mirror 110 which reflects beams 102 onto secondary mirror 120. Light rays 102 may be reflected by secondary mirror 120 towards eye-piece 160. Light rays 102 may be reflected by secondary mirror 120 onto tertiary mirror 130 of eye-piece 160. In one embodiment, tertiary mirror 130 substantially collimates light rays 102 and reflects collimated light rays 104 onto quaternary mirror 140 of eye-piece 160. Quaternary mirror 140 receives the substantially collimated light rays 104 from tertiary mirror 130, performs further collimation of light rays 104 received from tertiary mirror 130, and reflects further collimated rays 106 to exit pupil 150.

In one embodiment, tertiary mirror 130 and quaternary mirror 140 have higher order aspheric surface departures beyond those of conic departures (e.g., paraboloid, hyperboloid, or ellipsoid). Tertiary mirror 130 may be a positive-powered aspheric mirror which has a majority of the positive power that is expected in eye-piece 160 and is configured to substantially collimate rays 102 incident thereon. In one embodiment, quaternary mirror 140 is a slightly negative-powered near-flat aspheric mirror which has much less power than tertiary mirror 130, and is configured to further collimate light rays 104 incident thereon. In one embodiment, tertiary mirror 130 and quaternary mirror 140 having small tilts and centers may be used in optical system 100. The structure, parameters, and/or placement of tertiary mirror 130 and quaternary mirror 140 in optical system 100 may be arranged to cause a flat-field condition to be achieved at a desired magnification and off-axis aberrations (notably coma and astigmatism) over a desired field-of-view to be corrected. In one embodiment, a majority of the aberrations (e.g., coma, spherical, and astigmatism) are corrected by tertiary mirror 130, and further aberration correction is performed by quaternary mirror 140.

In one embodiment, by utilizing eye-piece 160, as described above, optical system 100 provides afocal functions even when the conic or aspheric departures of primary mirror 110 and secondary mirror 120 are optimal for use in a focal three-mirror anastigmat optical system.

In one embodiment, optical system 100 may be constructed to provide focal optical functions. Primary mirror 110 and secondary mirror 120 may be followed by a positive-powered ellipsoidal tertiary mirror (not shown) instead of eye-piece 160 that serves as a finite conjugate relay from a Cassegrain focus to a final image, thereby forming a focal three-mirror anastigmat optical system, as is known in the art and will not be described in detail herein. This tertiary mirror creates a flat-field condition, corrects aberrations (spherical, coma, and astigmatism), and re-images an entrance pupil to an exit pupil along the optical path that terminates at the final focus.

In one embodiment, primary mirror 110, secondary mirror 120, tertiary mirror 130, and quaternary mirror 140 may be designed on a computer with a ray-trace software package. Although the optical arrangement of various embodiments of this disclosure are new, an optical prescription for optical system 100 in FIG. 1 may be generated using an equation which is an industry standard, and would be known to one of ordinary skill in the art. One such prescription is shown in Table 1, in accordance with an embodiment.

TABLE 1

| surf | Mirror | Rd | cc | ad | ae | af | ag | thk | matl |
|---|---|---|---|---|---|---|---|---|---|
| 110 | primary | −236.219 | −0.992082 | n/a | n/a | n/a | n/a | −95.4467 | refl |
| 120 | secondary | −53.6431 | −1.80408 | n/a | n/a | n/a | n/a | 177.1860 | refl |
| 130 | tertiary | −45.4425 | 0.44080 | 4.367E−07 | −1.130E−09 | 6.251E−12 | −1.002E−14 | −16.0320 | Refl |
| 140 | quaternary | −138.621 | n/a | −6.117E−06 | 2.711E−09 | 2.842E−10 | −3.478E−12 | 9.5985 | Refl |
| 150 | exit pupil | Inf | n/a | n/a | n/a | n/a | n/a | n/a | Air |

Entrance pupil is on primary;
diameter is 98.425
Exit pupil diameter is 3.296
Afocal magnification is 29.86X
FOV is 0.2 × 0.2 deg
FOV offset is −0.618 deg in y-z plane (tangential; alpha).
and where
rd is radius;
ad, ae, af, and ag are aspheric constants;
cc is conic constant;
thk is thickness; and
matl is material.

From the optical prescription in Table 1, one of ordinary skill in the art will recognize that primary mirror 110 and secondary mirror 120 are mirrors that are optimized for an image-forming or focal three-mirror anastigmat telescope. In one embodiment, primary mirror 110, secondary mirror 120, tertiary mirror 130, and quaternary mirror 140 share a common optical axis without de-center and tilts. In one embodiment, Table 1 further provides an exemplary set of values for various parameters of tertiary mirror 130 and quaternary mirror 140, which as depicted in FIG. 1 are located behind primary mirror 110 and secondary mirror 120 to form a high performance afocal optical system.

Figure 2:
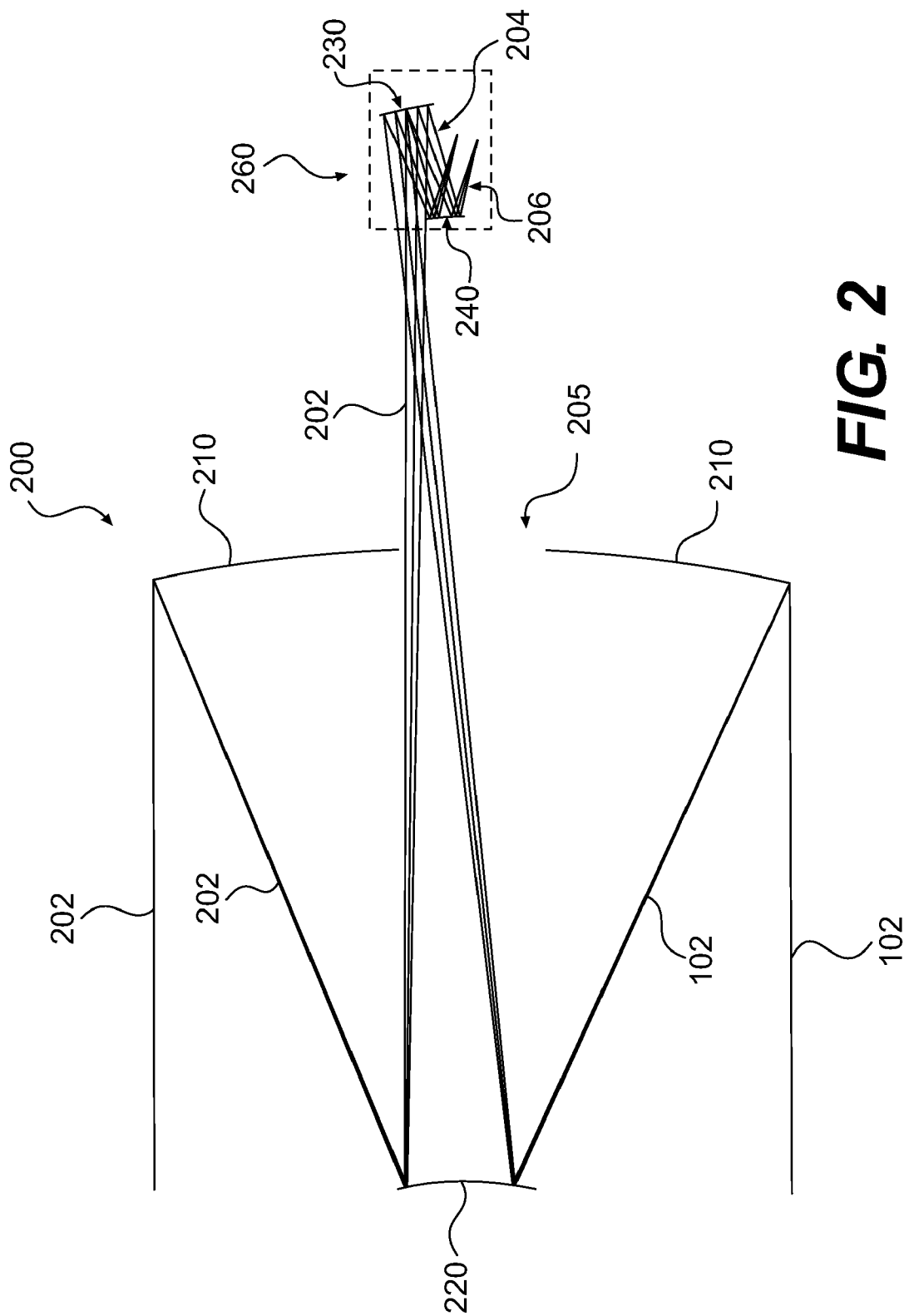
FIG. 2 is an exemplary illustration of a ray-trace section of an all-reflective optical system 200, in accordance with an embodiment.

FIG. 2 depicts a ray-trace section of an all-reflective optical system 200 that is constructed to provide afocal optical functions, in accordance with an embodiment. An optical prescription for optical system 200 is provided below in Table 2.

TABLE 2

| surf | Mirror | Rd | cc | ad | ae | af | ag |
|---|---|---|---|---|---|---|---|
| 210 | Primary | −236.219 | −0.992377 | n/a | n/a | n/a | n/a |
| 220 | Secondary | −46.4668 | −1.713868 | n/a | n/a | n/a | n/a |
| 230 | Tertiary | −52.6405 | 0.094520 | −5.877E−08 | −9.070E−10 | 2.521E−12 | −2.693E−15 |
| 240 | Quaternary | −760.275 | n/a | −5.279E−06 | 3.408E−09 | 1.677E−11 | −1.525E−13 |
| 250 | exit pupil | inf | n/a | n/a | n/a | n/a | n/a |

| surf | thk | matl | yd | xd | alpha | beta |
|---|---|---|---|---|---|---|
| 210 | −98.2117 | refl | n/a | n/a | n/a | n/a |
| 220 | 166.8208 | refl | n/a | 0.0329 | n/a | −0.09370 |
| 230 | −17.5662 | refl | −2.1153 | 0.1854 | −2.4457 | −0.2526 |
| 240 | 12.0853 | refl | −0.4288 | 0.1762 | 1.9344 | −0.4901 |
| 250 | n/a | Air | 1.2591 | 0.1605 | −15.2478 | −0.2673 |

Entrance pupil is on primary;
diameter is 98.425
Exit pupil diameter is 3.286
Afocal magnification is 29.95X
FOV is 0.2 × 0.2 deg
FOV offset is −0.638 deg in y-z plane (tangential; alpha)
and where
rd is radius;
ad, ae, af, and ag are aspheric constants;
cc is conic constant;
thk is thickness;
matl is material;
yd is y de-center;
xd is x de-center; and
alpha, beta are tilts.

In one embodiment, the construction of optical system 200 is similar to optical system 100 except for the following: i) secondary mirror 220 has. x de-center and beta tilt; ii) tertiary mirror 230 and quaternary mirror 240 each have different x, y de-centers and alpha, beta tilts associated therewith; iii) most of the values for various parameters of mirrors 210, 220, 230 and 240 in Table 2 are different from those on Table 1. From the optical prescription in Table 2, one of ordinary skill in the art will recognize that primary mirror 210 and secondary mirror 220 are also optimized for an image-forming or focal three-mirror anastigmat telescope. In one embodiment, Table 2 further provides an exemplary set of values for various parameters of tertiary mirror 230 and quaternary mirror 240, which as depicted in FIG. 2 are located behind primary mirror 210 and secondary mirror 220 to form a high performance afocal optical system.

It must be noted, however, that the prescriptions in Tables 1 and 2 are merely exemplary, and that the prescriptions of optical systems 100 and 200 are determined by the intended imaging task to be performed by optical system 100 and 200, respectively.

Figure 3:
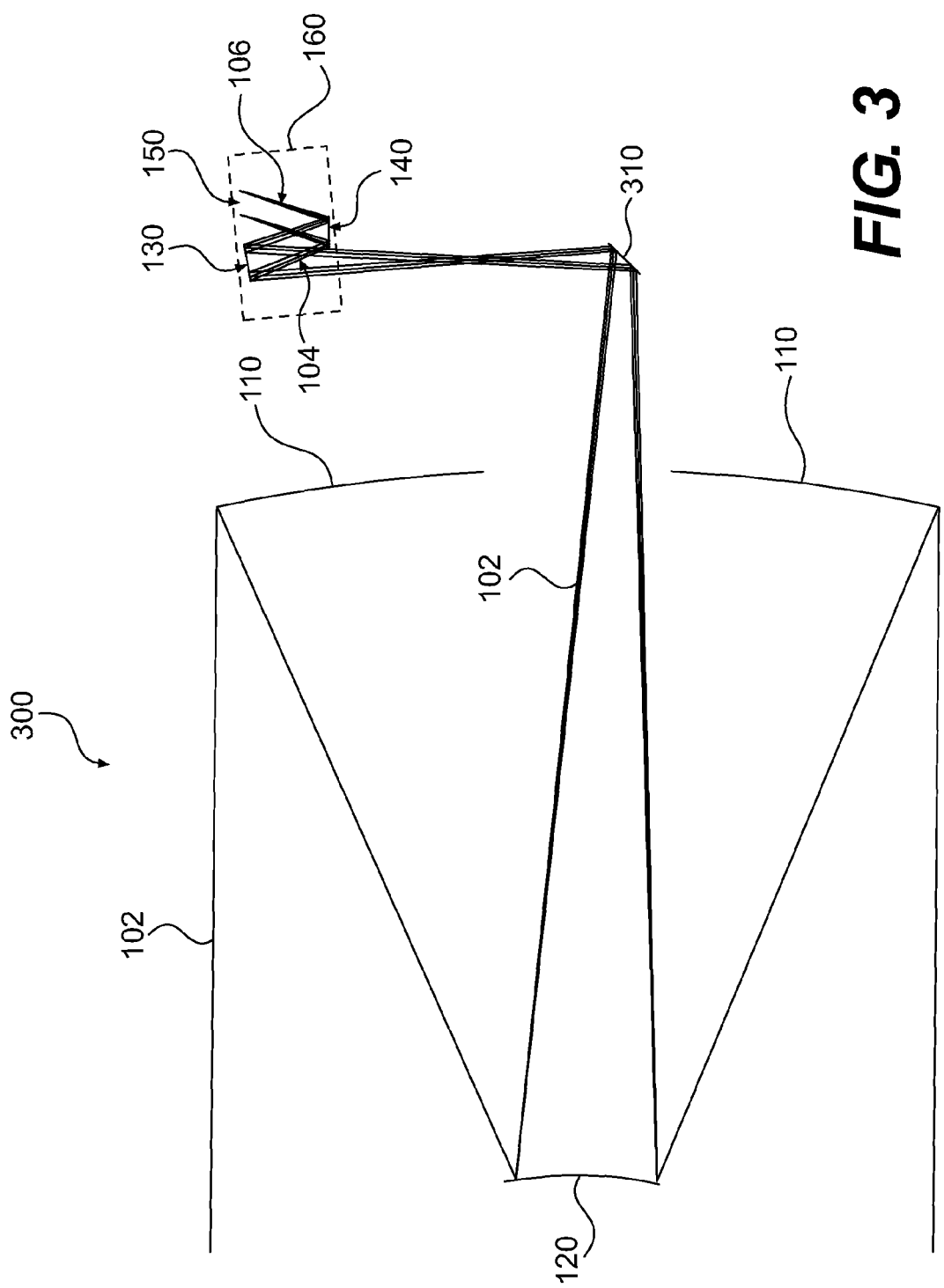
FIG. 3 is an exemplary illustration of a ray-trace section of the all-reflective optical system including a fold mirror, in accordance with an embodiment.

Alternate packaging schemes for all-reflective optical system 100 or 200 may also be provided. In one embodiment, FIG. 3 depicts a ray-trace section of an all-reflective optical system 300 including primary mirror 110, secondary mirror 120, eye-piece 160 comprising tertiary mirror 130 and quaternary mirror 140, and fold mirror 310. In one embodiment, fold mirror 310 is located behind primary mirror 110 just prior to the Cassegrain focus. In one embodiment, rays 102 are folded towards tertiary mirror 130 by fold mirror 310.

Figure 4:
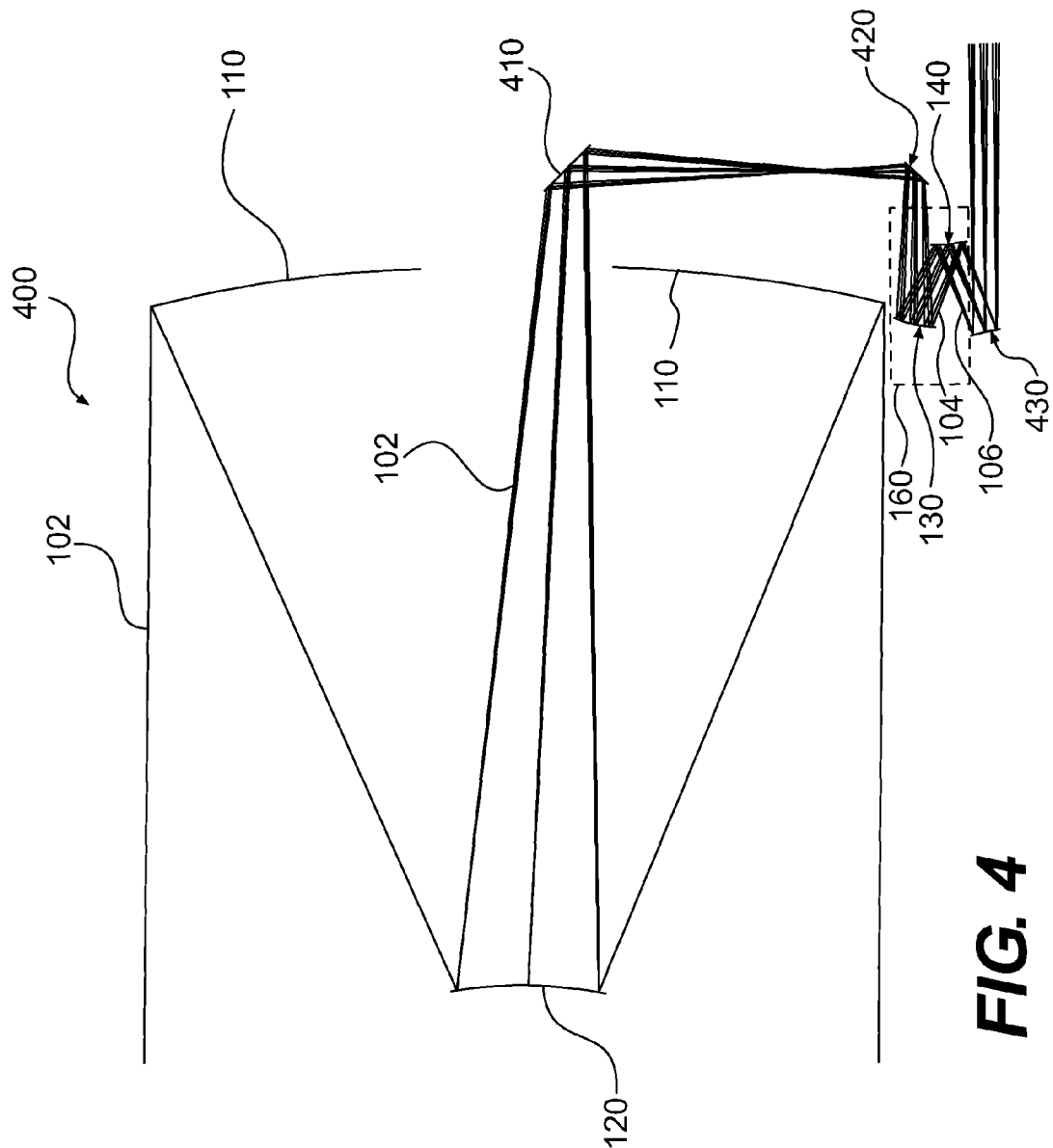
FIG. 4 is an exemplary illustration of a ray-trace section of the all-reflective optical system including fold mirrors and a beam steering mirror, in accordance with an embodiment.

In one embodiment, FIG. 4 depicts a ray-trace section of an all-reflective optical system 400 including primary mirror 110, secondary mirror 120, eye-piece 160 comprising tertiary mirror 130 and quaternary mirror 140, folding mirrors 410, 420, and beam steering mirror 430. In one embodiment, fold mirror 410 is located close to and behind primary mirror 110. In one embodiment, rays 102 are folded by fold mirror 410 towards another fold mirror 420, which fold rays 102 towards tertiary mirror 130. In one embodiment, quaternary mirror 140 reflects further collimated rays 106 towards beam steering mirror 430. One of ordinary skill in the art will recognize that an image-forming optical system may be arranged subsequent to beam steering mirror 430.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. An all-reflective optical system, comprising:
    a primary mirror of ellipsoidal configuration;
    a secondary mirror of hyperboloidal configuration facing said primary mirror; and
    an eye-piece comprising:
        a positive-powered tertiary mirror having a majority of positive power that is expected in the eye-piece and configured to substantially collimate light rays incident thereon; and
        a negative-powered near-flat quaternary mirror having lesser power than said tertiary mirror and configured to receive the substantially collimated light rays from the tertiary mirror, further collimate the received light rays and reflect the further collimated light rays to an exit pupil,
    wherein the primary mirror, the secondary mirror and the eye-piece form an afocal optical system.

2. The all-reflective optical system of claim 1, wherein the eye-piece is positioned behind the primary mirror and the secondary mirror.

3. The all-reflective optical system of claim 1, further comprising:
    a first fold mirror positioned behind the primary mirror and configured to receive light rays reflected from the secondary mirror and to fold the received light rays towards the tertiary mirror.

4. The all-reflective optical system of claim 3, further comprising:
- a second fold mirror configured to receive the light rays folded by the first fold mirror and to fold the light rays towards the tertiary mirror; and
- a beam steering mirror configured to receive the further collimated light rays reflected from the quaternary mirror.

5. The all-reflective optical system of claim 1, wherein the primary mirror is positive-powered.

6. The all-reflective optical system of claim 1, wherein the secondary mirror is negative-powered.

7. The all-reflective optical system of claim 1, wherein the tertiary mirror and quaternary mirror have higher order aspheric surface departures.

8. The all-reflective optical system of claim 1, wherein the tertiary mirror and the quaternary mirror each have different x and y de-centers and alpha and beta tilts associated therewith.

9. The all-reflective optical system of claim 1, wherein the secondary mirror has an x de-center and a beta tilt.

10. The all-reflective optical system of claim 1, wherein the primary mirror, the secondary mirror, the tertiary mirror, and the quaternary mirror share a common optical axis without de-center and tilts.

11. A method comprising:
- reflecting, using a primary mirror of ellipsoidal configuration, light rays incident thereon;
- reflecting, using a secondary mirror of hyperboloidal configuration facing said primary mirror, the light rays received from the primary mirror towards an eye-piece;
- substantially collimating, using a positive-powered tertiary mirror in the eye-piece, the light rays received from the secondary mirror and reflecting, using the positive-powered tertiary mirror, the substantially collimated light rays, wherein the positive-powered tertiary mirror has a majority of positive power that is expected in the eye-piece;
- receiving, using a negative-powered near-flat quaternary mirror in the eye-piece, the substantially collimated light rays from the positive-powered tertiary mirror, wherein the quaternary mirror has lesser power than said tertiary mirror;
- further collimating, using the negative-powered near-flat quaternary mirror, the substantially collimated light rays received from the positive-powered tertiary mirror; and
- reflecting, using the negative-powered near-flat quaternary mirror, the further collimated light rays to an exit pupil,
- wherein the primary mirror, the secondary mirror and the eye-piece form an afocal optical system.

12. The method of claim 11, further comprising:
- receiving, using a first fold mirror positioned behind the primary mirror, the light rays reflected from the secondary mirror and folding, using the fold mirror, the received light rays towards the tertiary mirror.

13. The method of claim 12, further comprising:
- receiving, using a second fold mirror, the light rays folded by the first fold mirror and folding, using the second fold mirror, the light rays towards the tertiary mirror; and
- receiving, using a beam steering mirror, the further collimated light rays reflected from the quaternary mirror.

* * * * *